March 24, 1925.  
A. S. SPEER  
WIRE CUTTING MACHINE  
Filed Dec. 2, 1920  
1,530,625  
2 Sheets-Sheet 1
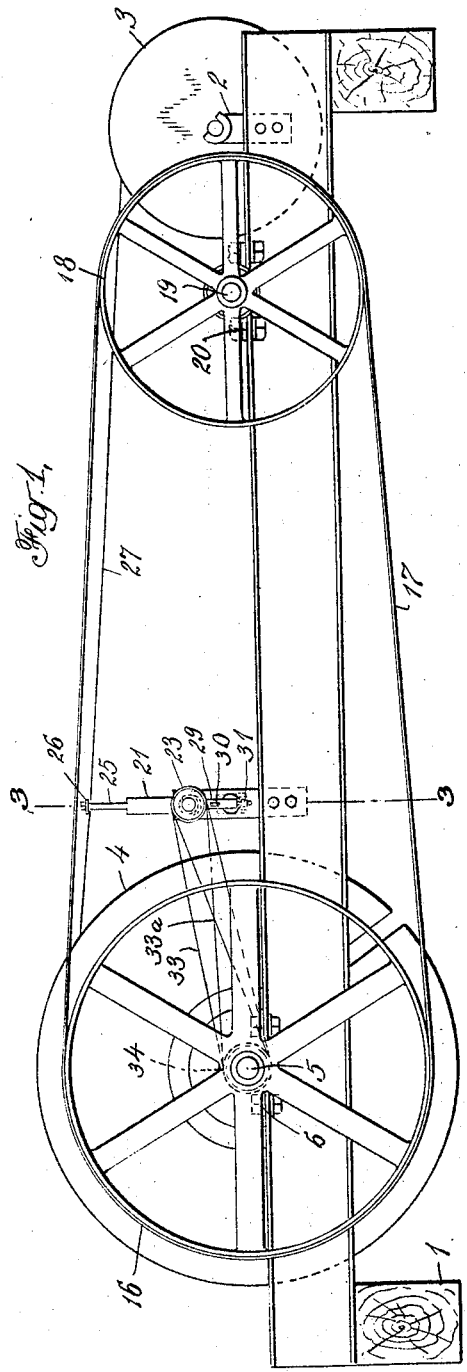
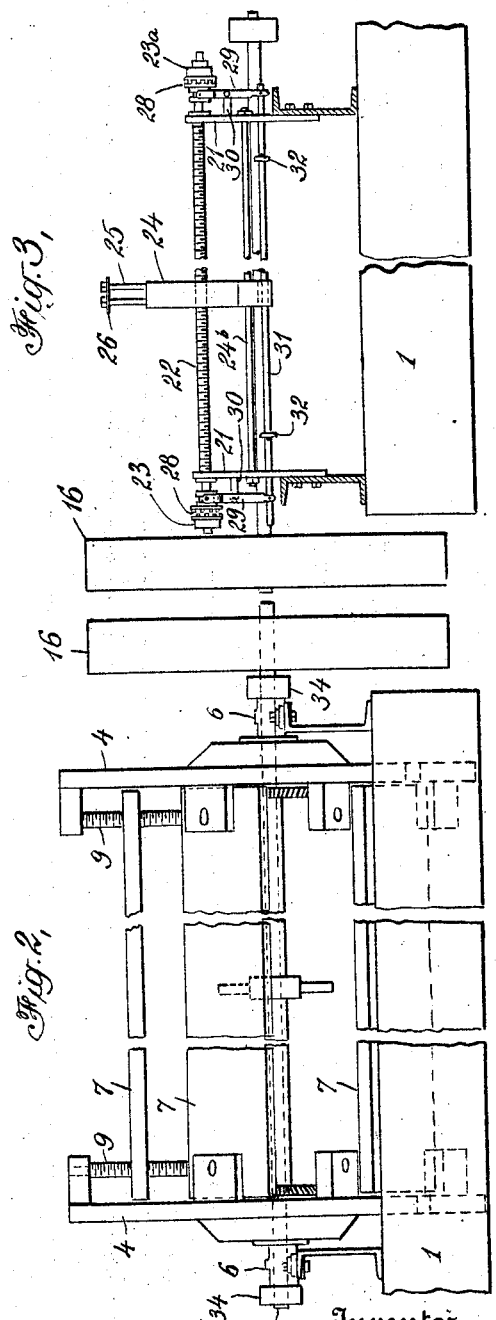

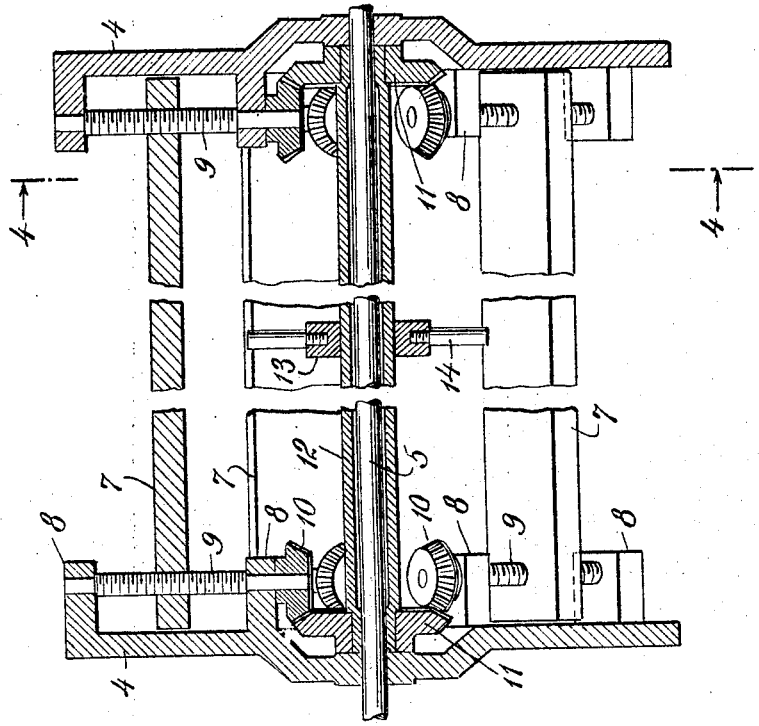

Patented Mar. 24, 1925.

1,530,625

UNITED STATES PATENT OFFICE.

ALEXANDER S. SPEER, OF BUFFALO, NEW YORK, ASSIGNOR, BY MESNE ASSIGNMENTS, TO THE BEAVER PRODUCTS COMPANY, INC., A CORPORATION OF NEW YORK.

WIRE-CUTTING MACHINE.

Application filed December 2, 1920. Serial No. 427,679.

*To all whom it may concern:*

Be it known that I, ALEXANDER S. SPEER, a citizen of the United States, residing at Buffalo, in the county of Erie, State of New York, have invented certain new and useful Improvements in Wire-Cutting Machines; and I do hereby declare the following to be a full, clear, and exact description of the invention, such as will enable others skilled in the art to which it appertains to make and use the same.

My invention is an improvement in wire cutting machines, and the invention has for its object to provide mechanism for permitting a number of pieces of wire of uniform length, such as are used, for instance, in baling shingles of composition roofing material, to be simultaneously cut, wherein a drum is provided upon which the wire to be cut is laid in coils, one alongside each other, the drum having a longitudinally extending passage on its peripheral surface along which a cutter may be passed to sever the lengths of wire.

A further object is to provide a winding drum for the wire which may be varied in diameter, to provide for the cutting of the wire into different lengths.

In the drawings—

Figure 1 is a side view of the improved machine,

Figure 2 is an end view,

Figure 3 is a section on the line 3—3 of Figure 1,

Figure 4 is a section on the line 4—4 of Figure 5, and

Figure 5 is a section on the line 5—5 of Figure 4.

In baling shingles of composition roofing material and the like, lengths of wire are used, either flat or circular in cross-section, which in the ordinary practice, are cut from a reel, the lengths of wire being withdrawn from the reel and cut off in succession. This is a slow and tedious process, requiring the continuous service of an operator. In the present invention a series of lengths are cut at the same time, the pieces of wire being of uniform length.

In the present embodiment of the invention a suitable supporting frame 1 is provided upon which is arranged a pair of open bearings 2 for receiving a wire supporting reel 3. A drum is also mounted on the frame, the said drum consisting of heads 4 which are secured in spaced relation on a shaft 5, and the shaft is journaled in bearings 6 on the frame. The wire is supported by a series of bars 7 which are arranged between the heads, and these bars are arranged to be moved toward and from the shaft 5 to vary the diameter of the drum, in order to vary the length of the pieces of wire which are cut.

The heads 4 have inwardly extending pairs of lugs 8, the said lugs of each pair being in radial alignment, and a screw 9 is journaled in each pair of lugs, the screws having plain ends for engaging the lugs. The bars 7 are mounted on the screws, to be moved thereby when the screws are rotated, and each bar is engaged by a screw at each end. Thus, a pair of screws is provided for moving each bar, and the screws of the pair are oppositely threaded as shown in Figure 5, one screw being left handed and the other right handed.

To the inner end of each screw inside the innermost lug 8, there is secured a bevel gear wheel 10, and the gears at each head 4 are engaged by a bevel gear wheel 11 secured on a sleeve 12 which is journaled on the shaft 5 between the heads. The sleeve is turned by means of a hand wheel arranged between the heads, the said wheel consisting of a hub portion 13 having radial pins 14 for convenience in manipulating the same, and the hub is secured to the sleeve. It will be obvious that by turning the hand wheel in the proper direction, all of the bars 7 may be simultaneously moved toward or from the shaft 5, to vary the diameter of the coils of wire which are wound on the drum.

Each head 4 has a slot 15, which extends inwardly from the edge thereof, and the slots of the two heads are in register. The slots 15 are for permitting the passage of a cutter by means of which the coils of wire on the drum may be cut, the slots being of sufficient depth to permit the cutter to pass beneath the coils, that is between the coils and the shaft. Referring to Figure 4 it will be seen that the slots extend to the innermost lug 8, so that the bars 7 will never be adjusted inwardly beyond the inner ends of the slots.

A pulley 16 is secured to the shaft 5 of the drum, and this pulley is engaged by a belt 17, which connects the pulley 16 with a pulley 18 on a shaft 19 which is journaled on the frame, parallel with the shaft 5, in bearings 20. The shaft 19 is connected with any suitable source of power, as for instance a motor which may be seated on the frame. The bearings 2 are open bearings, and referring to Figure 1 it will be noted that they face away from the drum, so that there is no tendency of the wire supporting reel to spring out of the bearings when the wire is withdrawn therefrom.

Mechanism is provided for laying the coils of wire smoothly on the drum and alongside each other. This mechanism is shown more clearly in Figures 1 and 3. The said mechanism comprises a pair of brackets 21 which extend upwardly from the frame 1 and within these brackets 21 there is journaled a screw 22 which carries at each end a loose pulley 23—23$^a$. A carriage 24 is supported by the screw, and by a guide rod 24$^b$ mounted in the brackets 21, the carriage having threaded engagement with the screw. A pair of rollers 25 extend upwardly from the carriage, the said rollers being connected at their upper ends by a cross-plate 26, and the wire indicated at 27 passes between these rollers.

The pulleys 23 and 23$^a$ are as before stated loose on the screw, and they are adapted to be connected to the screw by clutch mechanisms indicated at 28. Each of these clutch mechanisms is controlled by a lever 29, which has a fork at one end for engaging an annular groove in the movable member of the clutch, and each lever is pivoted intermediate its ends to an arm 30 extending outwardly from the adjacent bracket 21. The lower ends of the levers are connected by a bar 31 which is mounted to slide laterally of the frame 1, and the said bar has stop collars 32 arranged thereon, in position to be engaged by the carriage 24 at the end of its movement in each direction. It will be evident that when the carriage engages a stop collar, it will move the bar longitudinally, and transversely of the frame, and will connect one clutch 28 and release the other. Thus, the pulleys 23 and 23$^a$ will be connected in alternation to the screw, to cause the same to rotate in opposite directions, and the movement of the screw will be controlled by the movement of the carriage. Belts 33 and 33$^a$ connect the pulleys 23 and 23$^a$ with pulleys 34 on the drum shaft 5. The belt 33$^a$ is crossed, so that the pulley 23$^a$ will drive the screw in the opposite direction to that in which it will be driven by the pulley 23.

The operation of the machine is as follows:—

With a reel of wire in the bearings 2, and with the free end of the wire connected to the drum in any suitable manner, as for instance wrapping it about a bar 7, when the drum is started to rotating, the wire will be withdrawn from the reel, and will be laid in coils on the drum. After the wire has been laid, the drum is checked, and the cutter is passed beneath the coils of wire, moving in the slots 15. Each coil of wire will be cut, and the lengths of wire into which the coils are cut will be uniform or approximately so. If several layers of coils are wound on the drum, it will be evident that the lengths will vary slightly, the outermost coils being a trifle longer than the innermost coils. In order to vary the lengths cut, the bars 7 may be moved inwardly or outwardly by rotating the sleeve 12. When this sleeve is turned in one direction, the bars will be moved inwardly, and the coils laid upon the drum will be of less diameter than when the bars are moved outwardly. Any preferred form of cutter may be used to sever the coils.

What I claim is:

1. In a machine for winding and cutting strands of wire and the like, a winding drum of variable diameter, guide means controlled by the rotation of said drum for feeding the wire to said drum in successive layers, and manual means between the heads of said drum including a hand wheel therein and screw mechanism operable thereby for varying the diameter thereof, whereby to provide for cutting wires of the desired length.

2. In a machine for winding and cutting strands of wire and the like, a winding drum of variable diameter, guide means controlled by the rotation of said drum for feeding the wire to said drum in successive layers, and manual means for varying the diameter of the drum including a sleeve rotatably mounted on the drum shaft, radial screws adjacent the ends of the drum geared to said sleeve for simultaneous operation and a handle on the sleeve between the drum heads for actuating said screws.

In testimony whereof I affix my signature.

ALEXANDER S. SPEER.